(12) United States Patent
Hibino

(10) Patent No.: US 11,674,648 B2
(45) Date of Patent: Jun. 13, 2023

(54) LIGHTING FIXTURE

(71) Applicant: Panasonic Intellectual Property Management Co., Ltd., Osaka (JP)

(72) Inventor: Kota Hibino, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/833,064

(22) Filed: Jun. 6, 2022

(65) Prior Publication Data

US 2022/0390079 A1 Dec. 8, 2022

(30) Foreign Application Priority Data

Jun. 8, 2021 (JP) .............................. JP2021-096177

(51) Int. Cl.

| | |
|---|---|
| *F21V 21/30* | (2006.01) |
| *B60Q 3/57* | (2017.01) |
| *F21S 8/02* | (2006.01) |
| *F21V 14/06* | (2006.01) |
| *F21V 17/02* | (2006.01) |
| *F21V 17/06* | (2006.01) |
| *B60Q 3/44* | (2017.01) |
| *F21V 21/26* | (2006.01) |
| *F21W 107/30* | (2018.01) |

(52) U.S. Cl.
CPC ................ *F21S 8/02* (2013.01); *B60Q 3/44* (2017.02); *B60Q 3/57* (2017.02); *F21V 14/06* (2013.01); *F21V 17/02* (2013.01); *F21V 17/06* (2013.01); *F21V 21/26* (2013.01); *F21V 21/30* (2013.01); *F21W 2107/30* (2018.01)

(58) Field of Classification Search
CPC .......... F21V 21/30; F21V 21/26; F21V 21/28; F21V 21/29; B60Q 3/44; B60Q 3/51; B60Q 3/57; B60Q 3/76; F21W 2106/00; F21W 2107/30
See application file for complete search history.

(56) References Cited

U.S. PATENT DOCUMENTS

| | | | |
|---|---|---|---|
| 7,425,082 B1* | 9/2008 | Jones ..................... | A42B 3/044 362/269 |
| 8,602,614 B2 | 12/2013 | Schultheis et al. | |
| 2008/0205060 A1* | 8/2008 | Chien .................... | H04N 7/181 362/249.07 |

* cited by examiner

*Primary Examiner* — Sean P Gramling
(74) *Attorney, Agent, or Firm* — Greenblum & Bernstein, P.L.C.

(57) ABSTRACT

A lighting fixture includes a light source holder, a pair of position adjustors, and an outer shell. The light source holder holds a light source. The position adjustors are arranged to face each other and interpose the light source holder between themselves and supports the light source holder to allow the light source holder to rotate around a first virtual axis defined as a virtual axis passing through the position adjustors. The outer shell has an opening in which the light source holder and the position adjustors are arranged and supports the position adjustors to allow the position adjustors to rotate around a second virtual axis defined by a normal to an opening plane of the opening. The first virtual axis intersects with the second virtual axis and is located either within or behind the opening plane.

9 Claims, 13 Drawing Sheets

FIG. 6
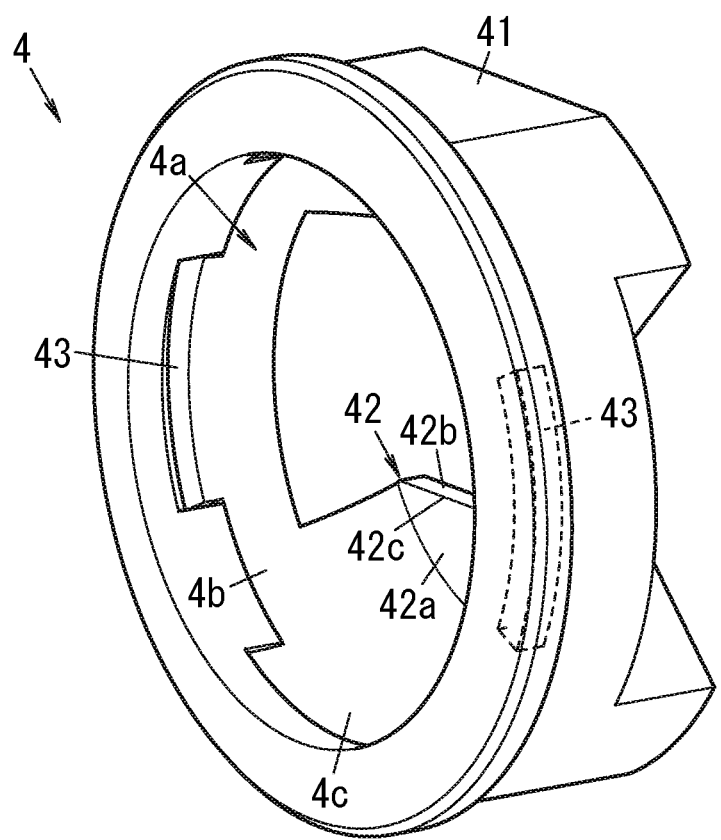
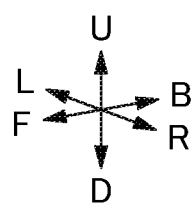

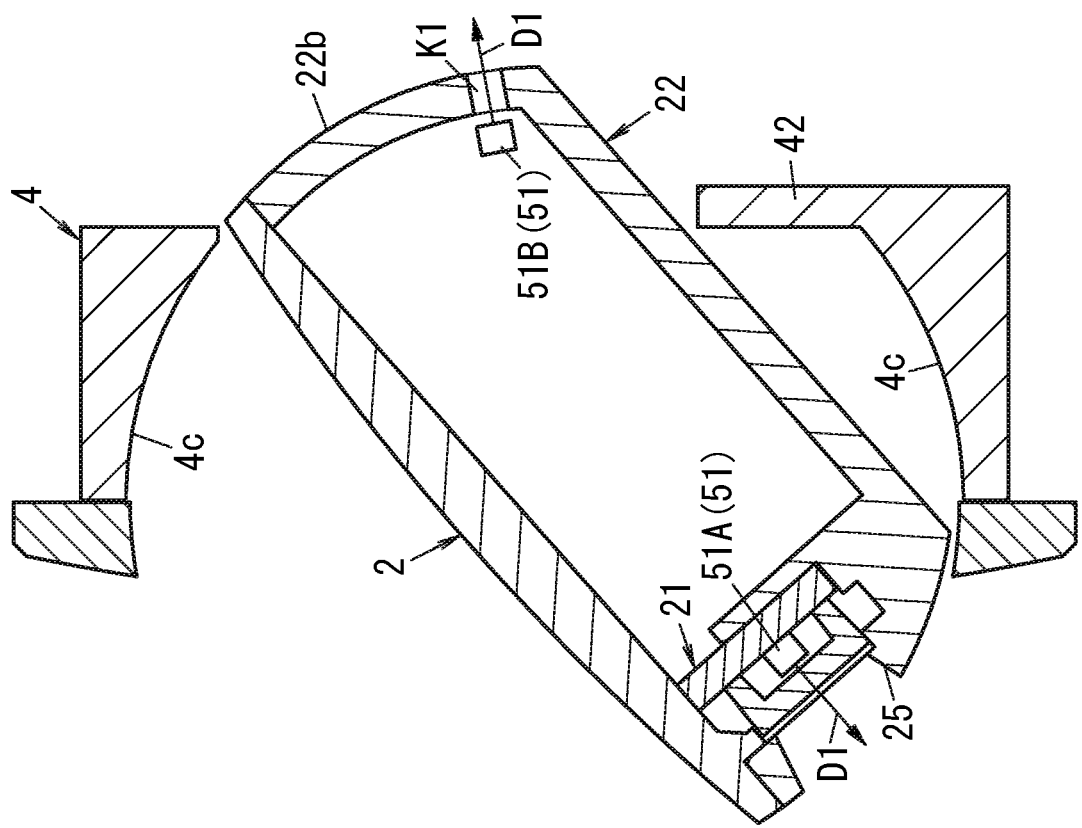
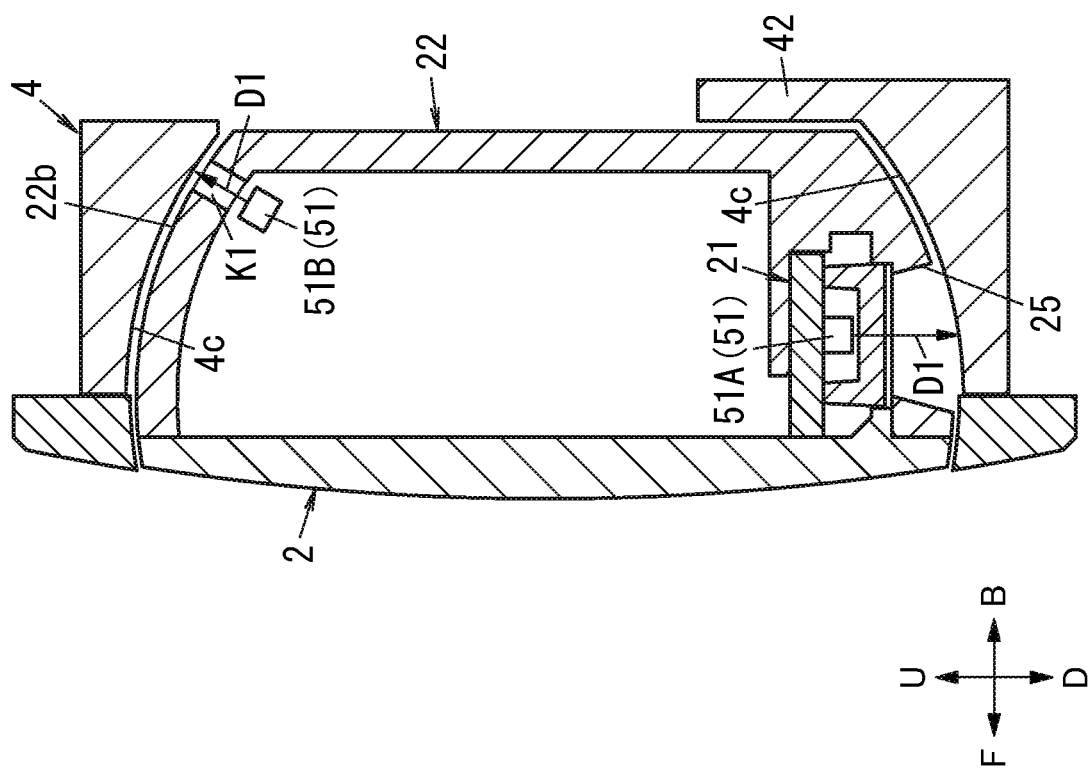

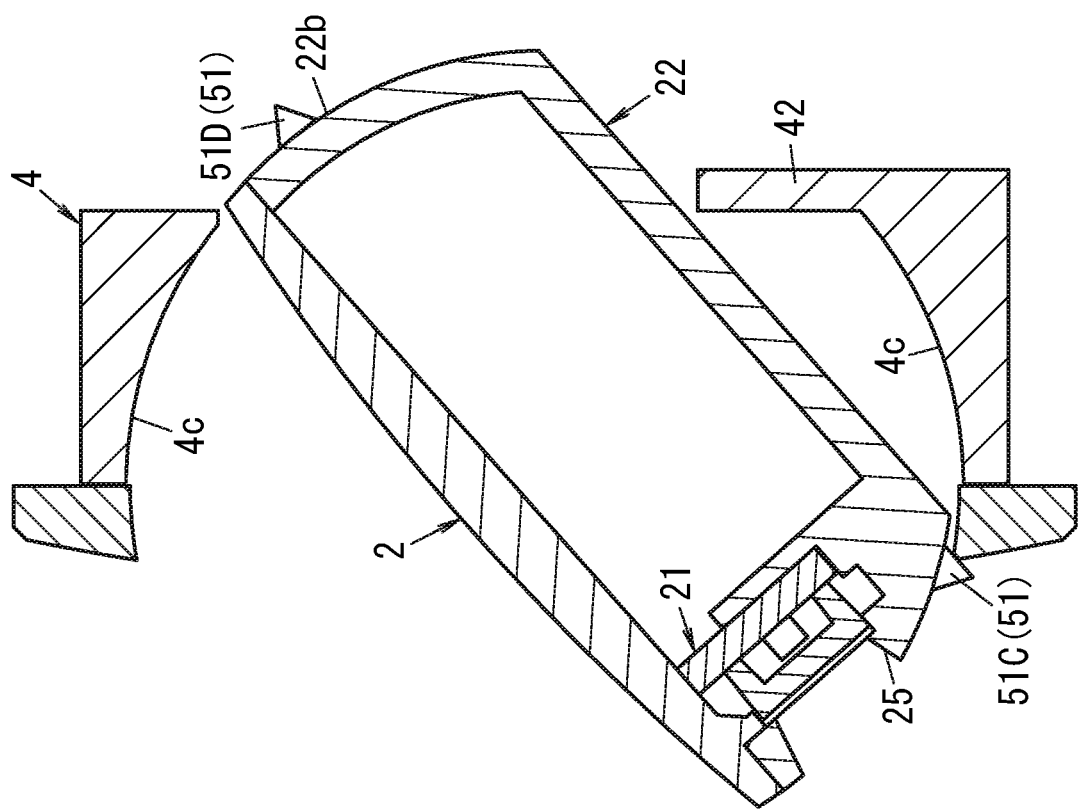
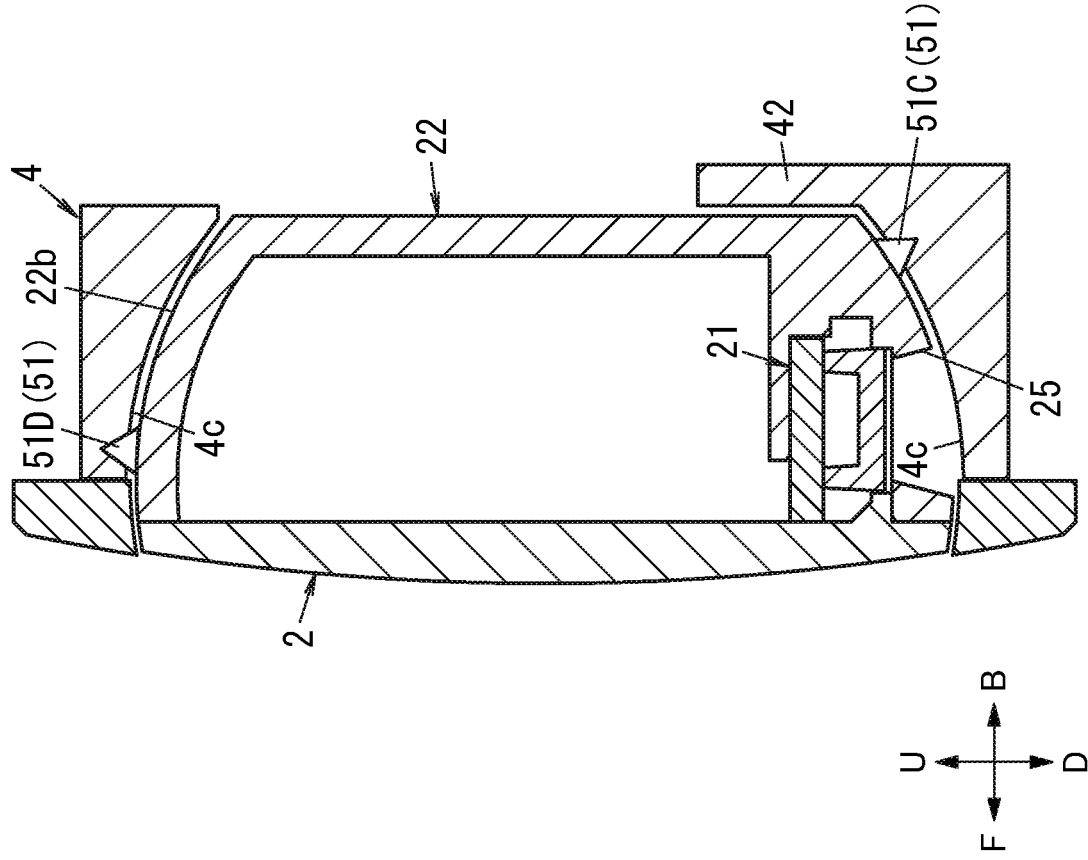

LIGHTING FIXTURE

CROSS-REFERENCE TO RELATED APPLICATIONS

The present application is based upon, and claims the benefit of priority to, Japanese Patent Application No. 2021-096177, filed on Jun. 8, 2021, the entire contents of which are hereby incorporated by reference.

TECHNICAL FIELD

The present disclosure generally relates to a lighting fixture and more particularly relates to a lighting fixture with the ability to change its illuminating direction around two virtual axes that intersect with each other.

BACKGROUND ART

U.S. Pat. No. 8,602,614 B2 discloses a lighting apparatus including a light source holder (movable cover), a position adjustor (adjusting element), and an outer shell (bearing unit). The position adjustor is embodied in the form of an adjusting ring and includes a housing portion. The position adjustor has a first virtual axis aligned with the diameter of the housing portion. The position adjustor supports the light source holder inside (i.e., in the housing portion) to allow the light source holder to rotate around the first virtual axis. The outer shell has a second virtual axis parallel to a normal to the front surface thereof. The outer shell supports the position adjustor on the front surface thereof to allow the position adjustor to rotate around the second virtual axis. In this lighting apparatus, the position adjustor protrudes forward from the front surface of the outer shell. This allows the operator to pinch the position adjustor with his or her fingers and turn the position adjustor around the second virtual axis.

The lighting apparatus of U.S. Pat. No. 8,602,614 B2 has such a structure that allows the operator to turn the position adjustor by pinching the position adjustor with his or her fingers, thus requiring the position adjustor to protrude to a certain degree from the front surface of the outer shell. This makes it difficult to reduce the thickness of the lighting apparatus (in particular, its part forward of the outer shell).

SUMMARY

The present disclosure provides a lighting fixture which may have a reduced thickness.

A lighting fixture according to an aspect of the present disclosure includes a light source holder, a pair of position adjustors, and an outer shell. The light source holder holds a light source. The pair of position adjustors are arranged to face each other and interpose the light source holder between themselves and support the light source holder thereon to allow the light source holder to rotate around a first virtual axis. The first virtual axis is defined as a virtual axis that passes through the pair of position adjustors. The outer shell has an opening in which the light source holder and the pair of position adjustors are arranged and supports the pair of position adjustors to allow the pair of position adjustors to rotate around a second virtual axis. The second virtual axis is defined by a normal to an opening plane of the opening. The first virtual axis intersects with the second virtual axis and is located either within or behind the opening plane.

BRIEF DESCRIPTION OF DRAWINGS

The figures depict one or more implementations in accordance with the present teaching, by way of example only, not by way of limitations. In the figures, like reference numerals refer to the same or similar elements.

FIG. 6 is a perspective view of an outer shell as another constituent element of the lighting fixture;

FIG. 10A illustrates a detection state of a contactless detection unit in a situation where the light source holder is located at a reference position in a first variation;

FIG. 10B illustrates a detection state of the contactless detection unit in a situation where the light source holder has rotated in the first variation;

FIG. 11A illustrates a detection state of a contact-type (mechanical) detection unit in a situation where the light source holder is located at the reference position in a second variation;

FIG. 11B illustrates a detection state of the contact-type (mechanical) detection unit in a situation where the light source holder has rotated in the second variation;

DESCRIPTION OF EMBODIMENTS

Embodiment

A lighting fixture 1 according to an exemplary embodiment will be described in detail with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from a true spirit and scope of the present disclosure. In the following description of embodiments, the arrangement of respective members of the lighting fixture 1 will be described with reference to the forward/backward directions, the rightward/leftward directions, and upward/downward directions that are indicated by the arrows shown in FIG. 1, for example. It should be noted, however, these arrows are just shown there as an assistant to description and are insubstantial ones. That is to say, these directions should not be construed as defining what direction the lighting fixture 1 is arranged to face or in what directions the lighting fixture 1 performs its intended functions.

(1) Overview of Lighting Fixture

First of all, an overview of the lighting fixture 1 will be described with reference to FIGS. 1 and 2.

A lighting fixture 1 according to an exemplary embodiment may be used as general-purpose illumination in consumer electronic appliances and various facilities. However, these are only examples. The lighting fixture 1 is also applicable for use in numerous types of moving vehicles including automobiles, watercrafts, and aircrafts. For example, the lighting fixture 1 may be installed indoors on a wall surface of a room. In that case, the illuminating light emitted from the lighting fixture 1 may be used to illuminate a certain range of space under its installation position. In the embodiment to be described below, the illuminating light cast from the lighting fixture 1 is used as a spotlight, for example. However, the illuminating light does not have to be a spotlight.

Figure 1:
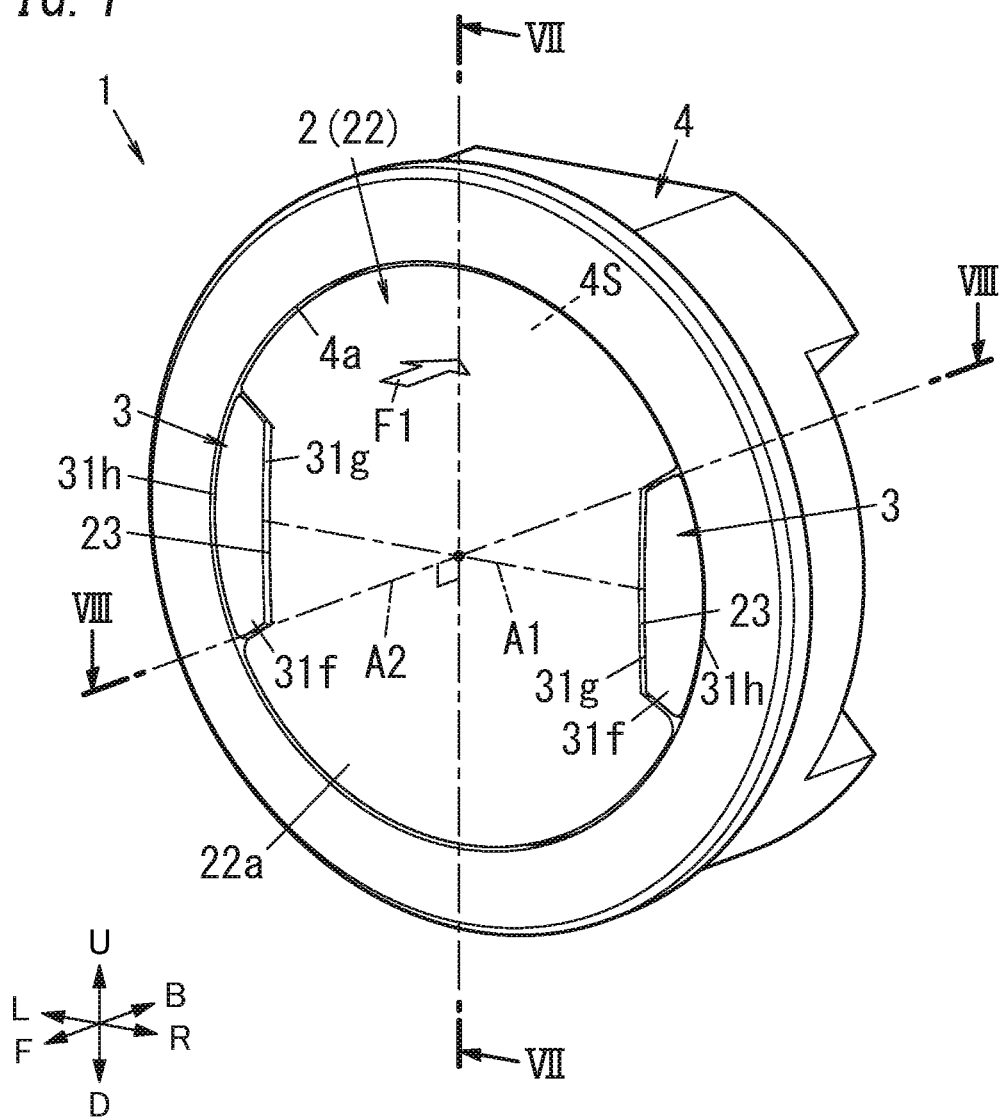
FIG. 1 is a perspective view of a lighting fixture according to an exemplary embodiment.
Figure 2:
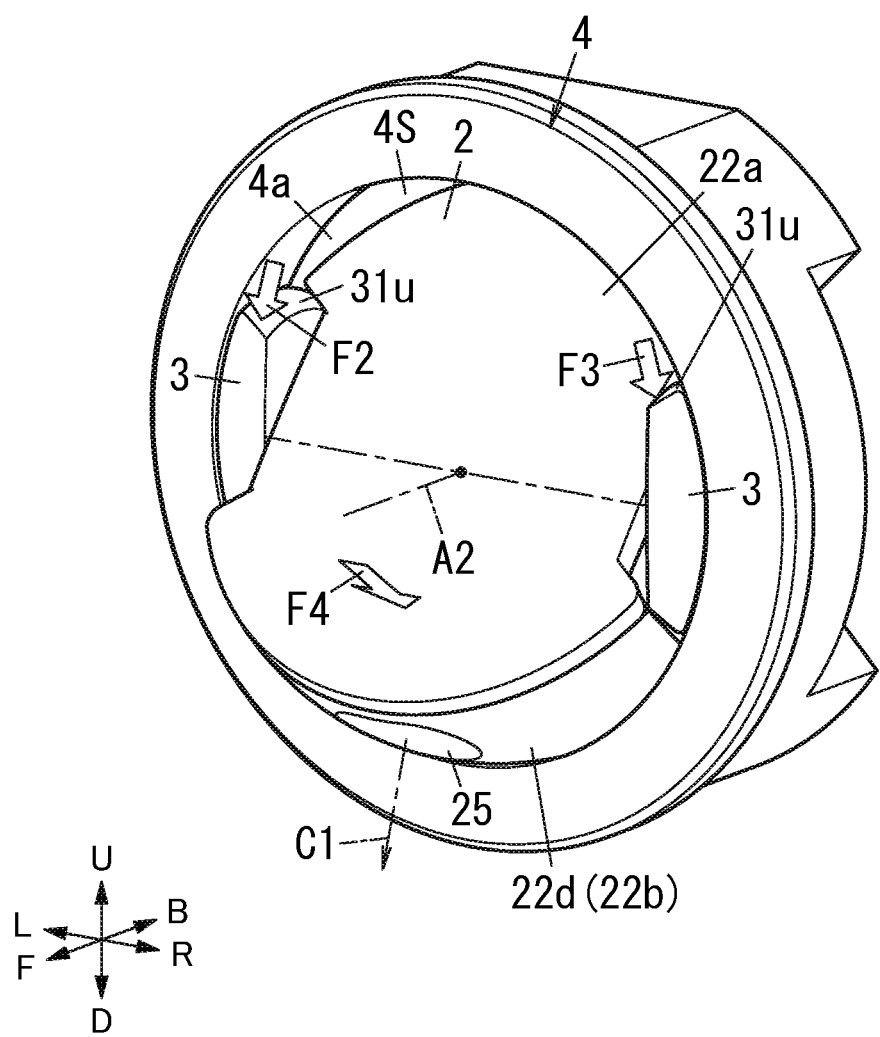
FIG. 2 is a perspective view showing a state where a light source holder has rotated around a first virtual axis in the lighting fixture.

As shown in FIGS. 1 and 2, the lighting fixture 1 includes a light source holder 2, a pair of position adjustors 3, and an outer shell 4.

Figure 7:
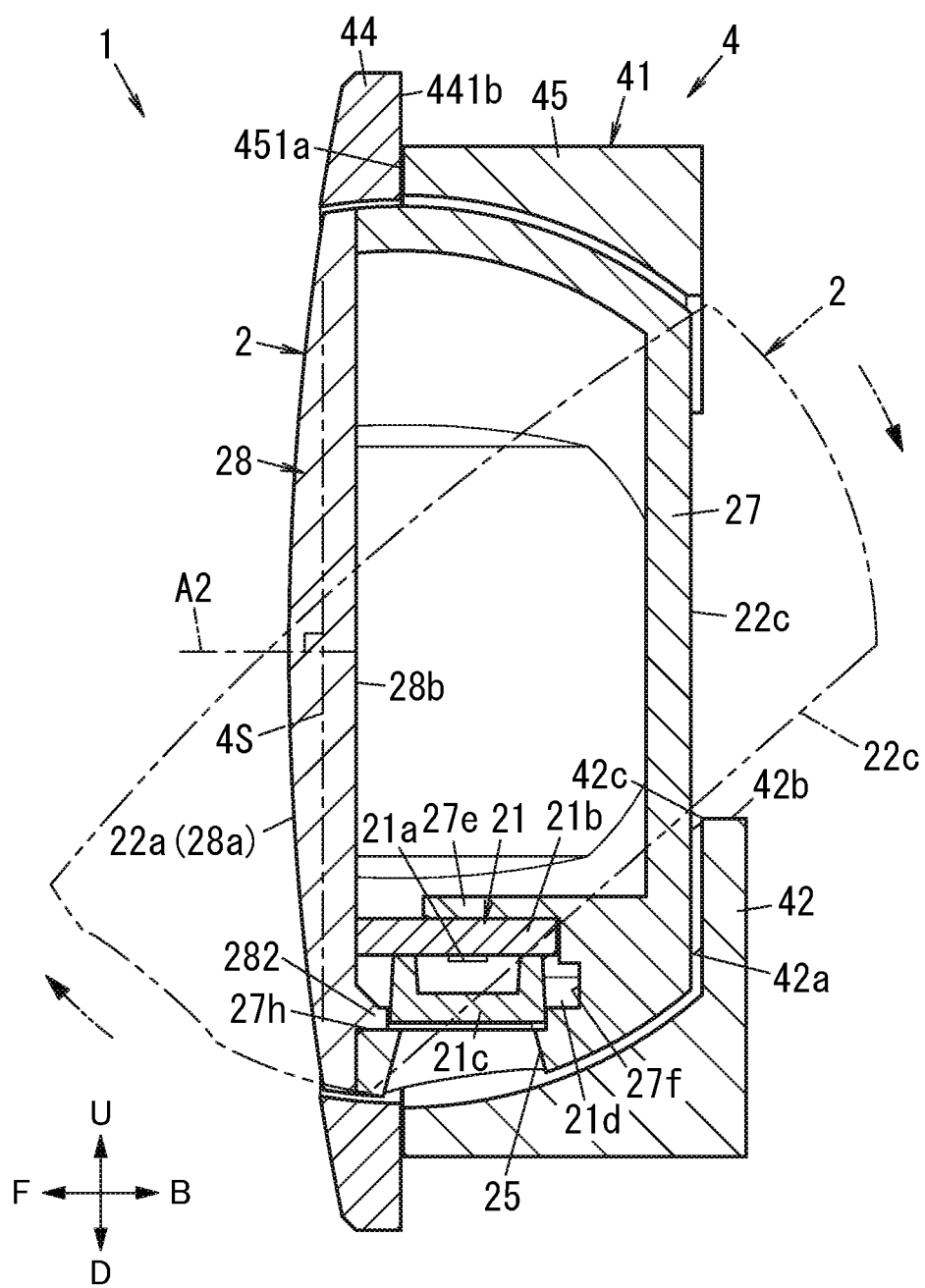
FIG. 7 is a cross-sectional view of the lighting fixture taken along the plane VII-VII shown in FIG. 1.

The light source holder 2 holds a light source 21a (see FIG. 7). An outer peripheral side surface 22b (more specifically, a lower surface 22d) of the light source holder 2 is provided with a lighting window 25. The lighting window 25 is a window that allows the light (illuminating light) emitted from the light source 21a to emerge out of the light source holder 2 therethrough.

The pair of position adjustors 3 are arranged to face each other to interpose the outer shell 4 between themselves. The pair of position adjustors 3 supports the light source holder 2 thereon to allow the light source holder 2 to rotate around a first virtual axis A1 (see FIG. 1). The first virtual axis A1 is defined as a virtual axis that passes through the pair of position adjustors 3.

The outer shell 4 has an opening 4a in which the light source holder 2 and the pair of position adjustors 3 are arranged. The outer shell 4 supports the pair of position adjustors 3 to allow the pair of position adjustors 3 to rotate around a second virtual axis A2 (see FIG. 1). The second virtual axis A2 is defined by a normal to an opening plane 4S of the opening 4a. The normal is drawn to the center of the opening plane 4S. The first virtual axis A1 intersects (e.g., at right angles) with the second virtual axis A2 and is located either within or behind the opening plane 4S.

This lighting fixture 1 allows the operator to turn the light source holder 2 around two virtual axes (namely, the first virtual axis A1 and the second virtual axis A2) by operating the light source holder 2 (e.g., with his or her fingers). The user's turning the light source holder 2 around the first virtual axis A1 (see FIG. 2) allows the lighting window 25 of the light source holder 2 to protrude forward of the outer shell 4 and be exposed downward. This allows the light C1 (illuminating light) emitted from the light source 21a to be projected downward through the lighting window 25 and illuminate a certain range under the lighting fixture 1. In addition, the orientation of the lighting window 25 of the light source holder 2 may also be changed to the right and to the left by making the operator turn the light source holder 2 around the second virtual axis A2 in this illumination state. This makes the irradiation range of the light source 21a changeable to the right and to the left.

In this lighting fixture 1, the first virtual axis A1 intersects (e.g., at right angles) with the second virtual axis A2 and is located either within or behind the opening plane 4S of the outer shell 4. This may reduce the protrusion of the light source holder 2 and the pair of position adjustors 3 forward of the opening plane 4S of the outer shell 4. In other words, this allows the light source holder 2 and the pair of position adjustors 3 to be housed inside the outer shell 4 either entirely or almost entirely. Consequently, the lighting fixture 1 (in particular, its part forward of the outer shell 4) may have a reduced thickness.

(2) Details of Lighting Fixture (2-1) Configuration of Lighting Fixture

Next, a configuration for the lighting fixture 1 will be described in detail with reference to FIGS. 1-9.

Figure 3:
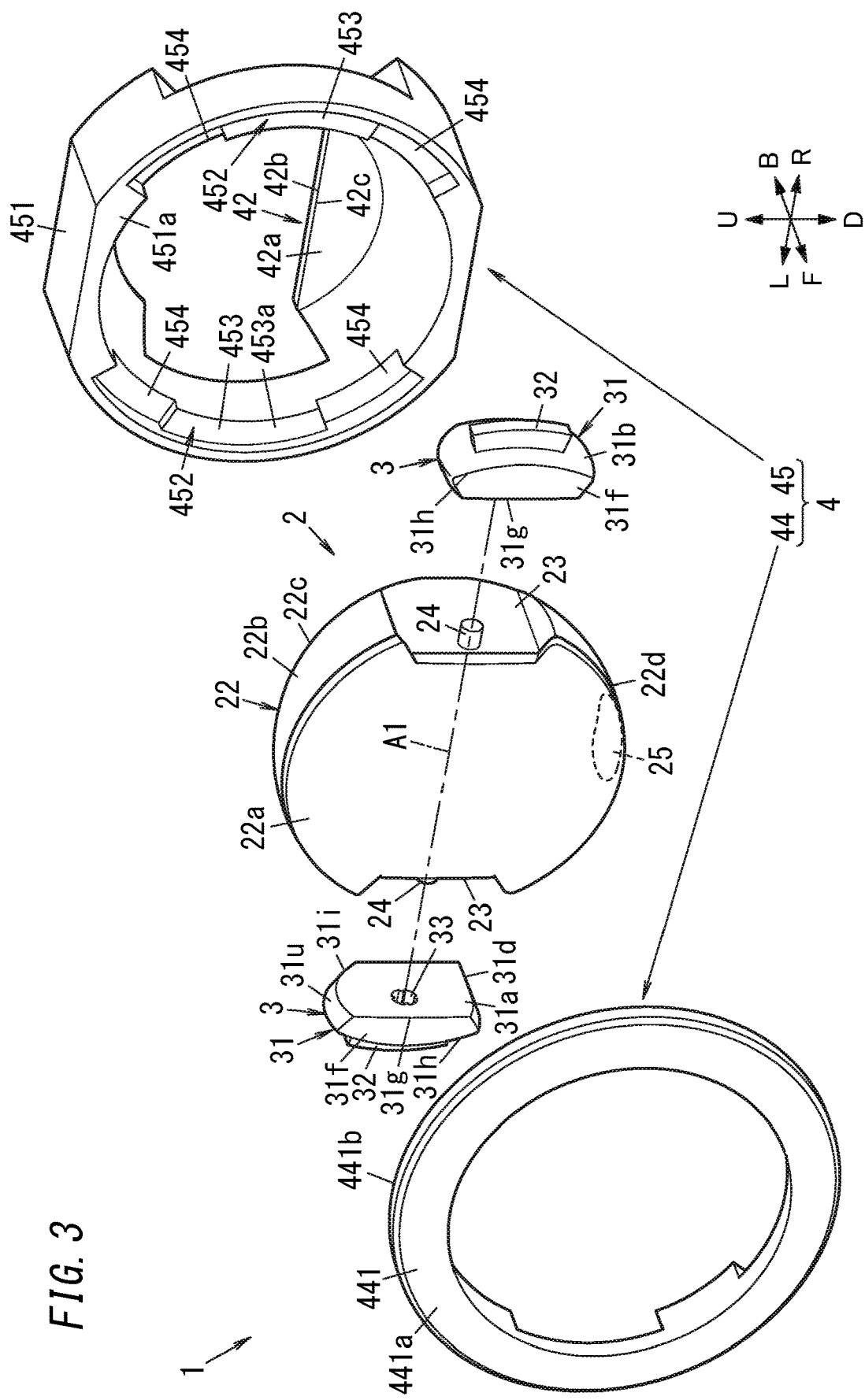
FIG. 3 is an exploded front perspective view of the lighting fixture.
Figure 4:
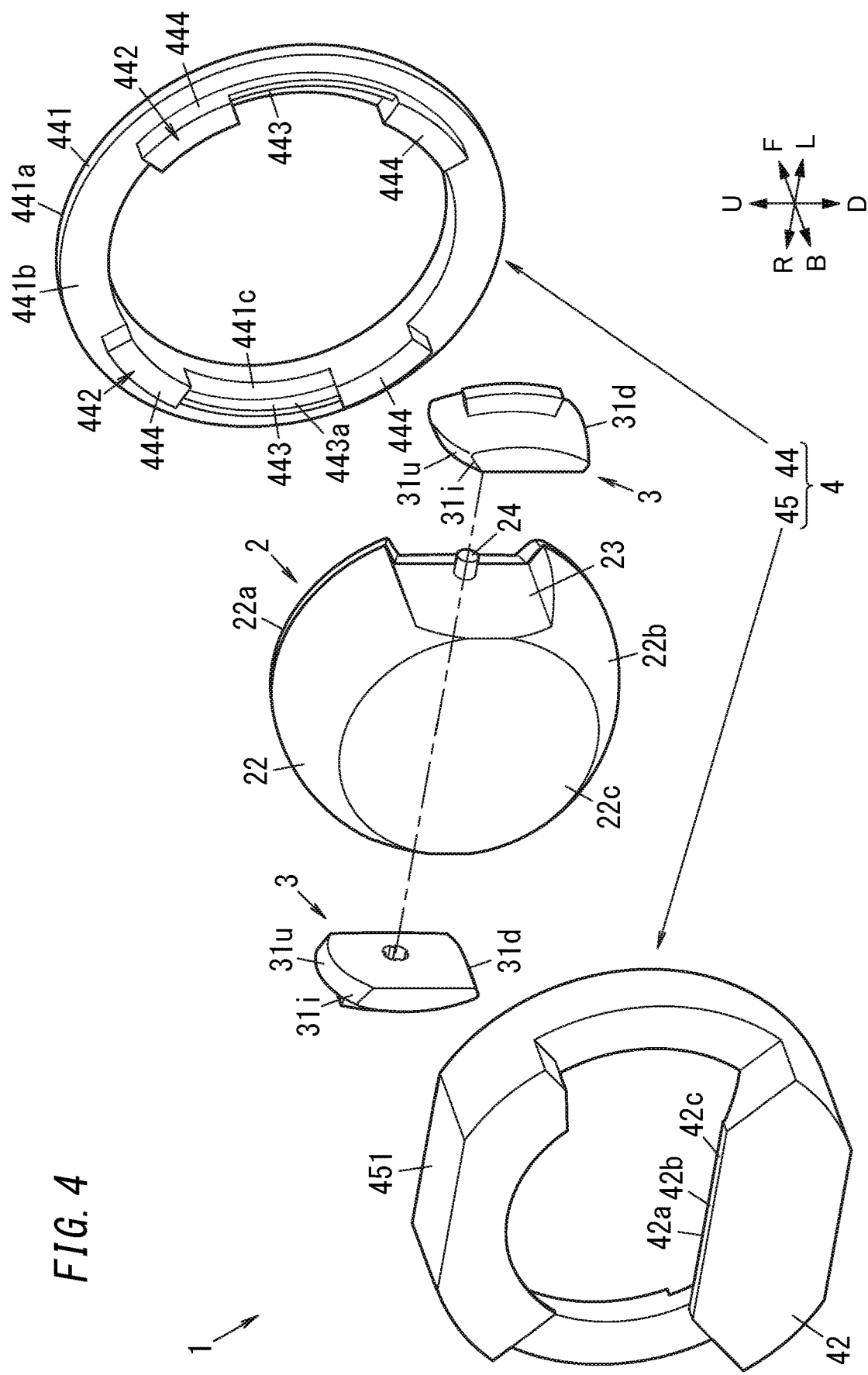
FIG. 4 is an exploded rear perspective view of the lighting fixture.
Figure 9:
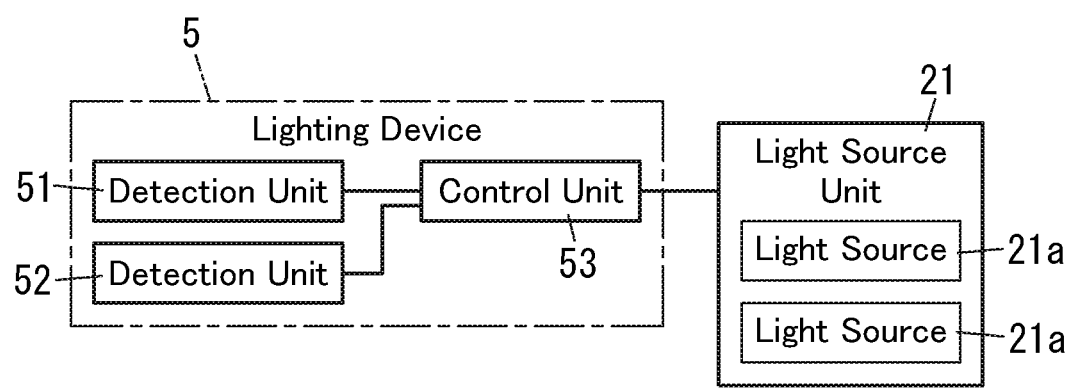
FIG. 9 is a block diagram of a lighting device as another constituent element of the lighting fixture.

As shown in FIGS. 3, 4, and 9, the lighting fixture 1 includes the light source holder 2, the pair of position adjustors 3, the outer shell 4, and a lighting device 5 (see FIG. 9).

(2-1-1) Light Source Holder

Figure 5:
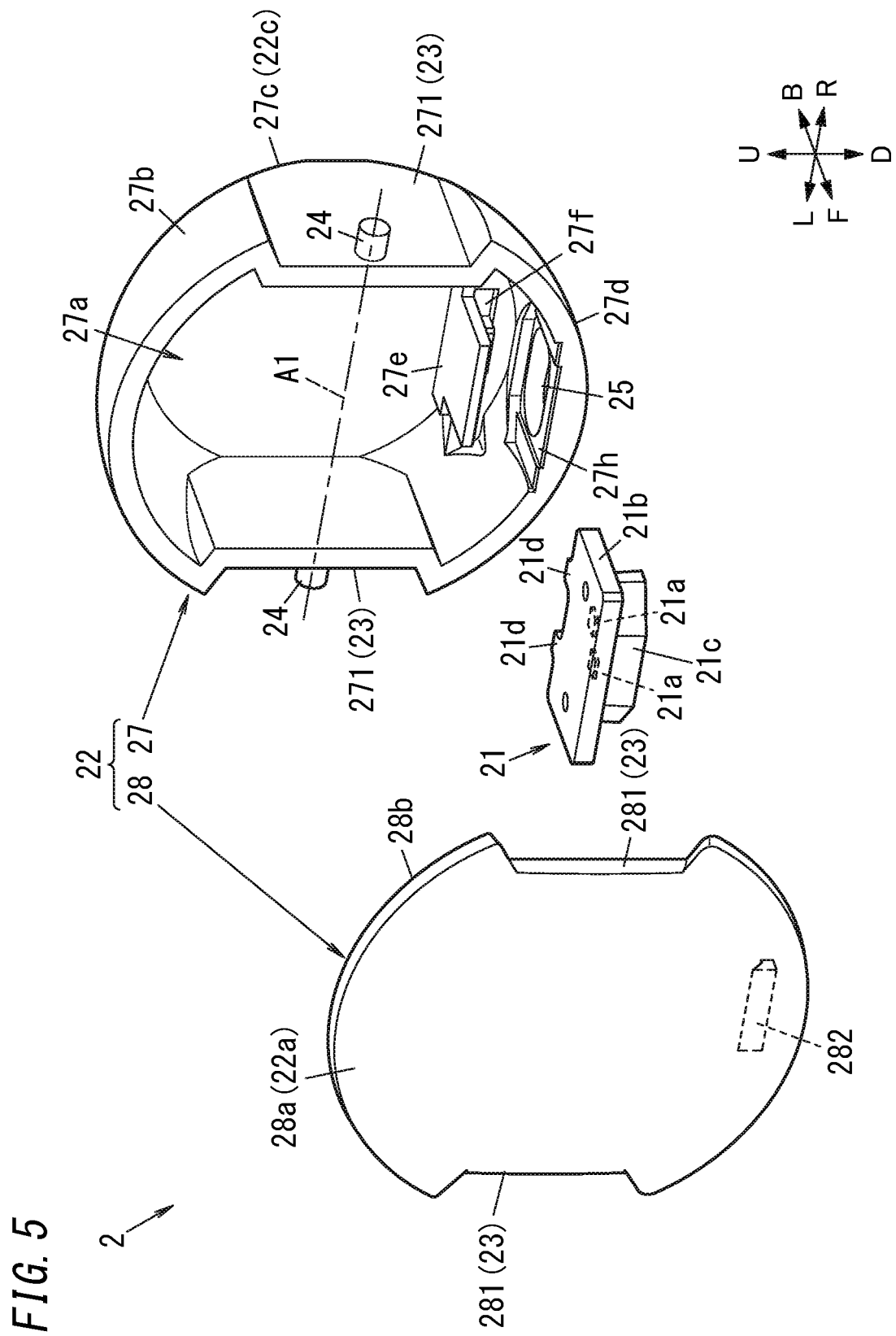
FIG. 5 is an exploded perspective view of a light source holder as a constituent element of the lighting fixture.

As shown in FIGS. 3, 4, and 5, the light source holder 2 includes a light source unit 21 (see FIG. 5) and a casing 22.

The light source unit 21 includes a plurality of (e.g., two) light sources 21a, a mount substrate 21b, and a light transmitting portion 21c (see FIG. 5).

The plurality of light sources 21a may be, for example, light-emitting diodes (LEDs). The plurality of light sources 21a emit light beams in mutually different colors (e.g., neutral white and incandescent). The plurality of light sources 21a are turned ON and OFF by the lighting device 5. Also, the plurality of light sources 21a may also be selectively turned ON by, for example, the lighting device 5. This allows changing the light color of the illuminating light emitted from the lighting fixture 1.

The mount substrate 21b is a substrate to mount the light sources 21a thereon. The mount substrate 21b has two fitting projections 21d. The fitting projections 21d are portions to be respectively fitted into two fitting recesses 27f (to be described later) of the casing 22. Fitting the fitting projections 21d into the fitting recesses 27f allows the light source unit 21 to be positioned inside the casing 22. The light sources 21a are mounted on one surface (e.g., the lower surface) out of the two principal surfaces of the mount substrate 21b. The light transmitting portion 21c protects the light sources 21a and serves as a lens for controlling (e.g., diffusing or condensing) the light emitted from the light sources 21a. The light transmitting portion 21c is made of a material with light-transmitting properties (such as a resin) and formed in the shape of a box, of which the upper surface is open. The light transmitting portion 21c is disposed on the lower surface of the mount substrate 21b to house the light sources 21a therein.

The casing 22 is a box-shaped member for housing the light source unit 21 therein and holds the light source unit 21 housed in itself. The casing 22 may be made of a resin, for example. The casing 22 may have a generally hemispherical box shape. More specifically, the shape of the casing 22 is formed by cutting off a front half of a sphere to leave a rear half thereof and by further cutting off a rear end portion of the rear half (see FIGS. 3 and 4). Specifically, the casing 22 includes a front surface 22a, an outer peripheral side surface 22b, and a rear surface 22c. The front surface 22a has a generally circular planar surface. As used herein, the "planar surface" refers to not only a perfectly planar surface but also a substantially planar surface (i.e., a gently convex or concave curved surface). In this embodiment, the front surface 22a of the casing 22 is a gently convex curved surface. The rear surface 22c is a circular planar surface having a smaller diameter than the front surface 22a. The outer peripheral side surface 22b is located on the respective outer peripheries of the front surface 22a and the rear surface 22c, is curved to be outwardly convex, and forms part of the spherical surface.

The casing 22 includes a pair of recesses 23, a pair of projecting shafts 24, and the lighting window 25 (see FIGS. 3 and 4).

The pair of recesses 23 are portions to receive the pair of position adjustors 3. In this embodiment, the pair of recesses 23 is shaped to be fitted onto the pair of position adjustors 3. When the casing 22 is viewed from in front of the front surface 22a thereof, the pair of recesses 23 are provided on the right and left sides (i.e., on both sides along the first virtual axis A1) of the casing 22. The pair of recesses 23 extends, in the forward/backward direction, from the front surface 22a of the casing 22 through the rear surface 22c thereof on the right and left sides of the casing 22.

The pair of projecting shafts 24 are to be rotatably fitted into the pair of position adjustors 3. A line segment connecting the pair of projecting shafts 24 together is aligned with the first virtual axis A1. Each of the pair of projecting shafts 24 is a circular columnar projection. The pair of projecting shafts 24 are each provided on the bottom surface of an associated one of the pair of recesses 23 so as to be located at the middle of the front edge of the bottom surface. The pair of projecting shafts 24 protrudes to the right and to the left, respectively.

The lighting window 25 allows the light emitted from the light sources 21a to emerge out of the casing 22. The lighting window 25 is provided for a predetermined part (e.g., the lower surface 22d) of the outer peripheral side surface 22b of the casing 22. The lighting window 25 may be a hole that penetrates through the casing 22 to allow the inside and outside of the casing 22 to communicate with each other. The lighting window 25 may be, for example, an elliptical hole elongated in the rightward/leftward direction.

(2-1-2) Assembled Structure of Casing

As shown in FIG. 5, the casing 22 includes a casing body 27 and a front panel 28. That is to say, the casing 22 is an assembly of two separate parts that are the casing body 27 and the front panel 28.

The casing body 27 forms the rest of the casing 22 other than the front portion thereof and may have the shape of, for example, a generally hemispherical box, of which the front surface is open. The casing body 27 includes a front opening 27a, an outer peripheral side surface 27b, and a rear surface 27c. The front opening 27a is provided through the entire front side of the casing body 27 and communicates with the internal space of the casing body 27. The outer peripheral side surface 27b forms the rest of the outer peripheral side surface 22b of the casing 22 other than the front edge portion of the casing 22. The rear surface 27c is the rear surface 22c of the casing 22. The casing body 27 includes a pair of recesses 271, the pair of projecting shafts 24, and the lighting window 25. The pair of recesses 271 are provided on the right and left side portions of the casing body 27 and forms the rest of the pair of recesses 23 of the casing 22 other than front edge portions thereof. The pair of projecting shafts 24 forms parts of the casing 22 as described above. The lighting window 25 is provided through a predetermined part (e.g., the lower surface 27d) of the outer peripheral side surface 27b of the casing body 27.

The casing body 27 includes a holding portion 27e and two fitting recesses 27f.

The holding portion 27e holds the light source unit 21 thereon. In this embodiment, a predetermined part (e.g., the bottom surface) 27h of an inner peripheral side surface of the casing body 27 is flat. The holding portion 27e holds the light source unit 21 by sandwiching the light source unit 21 between itself and the bottom surface 27h of the inner peripheral side surface of the casing body 27. The holding portion 27e has a plate shape. The holding portion 27e is provided for a lower part of an inner rear surface of the casing body 27 and protrudes forward. The holding portion 27e is arranged to face the lighting window 25.

The two fitting recesses 27f are to be fitted onto the two fitting projections 21d of the light source unit 21 as described above. The two fitting recesses 27f are provided on the inner rear surface of the casing body 27 and under the holding portion 27e and are arranged side by side in the rightward/leftward direction.

The front panel 28 closes the front opening 27a of the casing body 27. The front panel 28 has a generally circular plate shape. The front surface 28a of the front panel 28 is the front surface 22a of the casing 22. The front panel 28 has a pair of recesses 281 and a hooking projection 282.

The pair of recesses 281 are provided on right and left ends of the front panel 28. The pair of recesses 281 constitutes the respective front edge portions of the pair of recesses 23 of the casing 22. In other words, the pair of recesses 23 of the casing 22 are made up of the pair of recesses 271 of the casing body 27 and the pair of recesses 281 of the front panel 28.

The hooking projection 282 is provided to position the front panel 28 relative to the front opening 27a of the casing body 27. The hooking projection 282 is provided for the rear surface 28b of the front panel 28, protrudes backward from the rear surface 28b, and extends in the rightward/leftward direction on the front panel 28. The hooking projection 282 is provided for a lower part of the rear surface 28b and is hooked on a front edge portion of the bottom surface 27h of the inner peripheral side surface of the casing body 27.

(2-1-3) How to Assemble Casing

Next, it will be described with reference to FIG. 7 how to assemble the casing 22. First, the front panel 28 is put on the front peripheral edge of the casing body 27. In this state, the front panel 28 is fixed with an adhesive or screws onto the peripheral edge portion of the front opening 27a (see FIG. 5) of the casing body 27. The front panel 28 thus fixed closes the front opening 27a of the casing body 27. Meanwhile, the hooking projection 282 of the front panel 28 is hooked on the bottom surface 27h of the inner peripheral side surface of the casing body 27, thereby positioning the front panel 28 with respect to the front opening 27a of the casing body 27.

Also, inside the casing 22, the light source unit 21 is placed to be sandwiched between the holding portion 27e of the casing body 27 and the bottom surface 27h. In addition, the two fitting projections 21d of the light source unit 21 are respectively fitted into the two fitting recesses 27f on the inner rear surface of the casing body 27. Furthermore, the front surface of the light transmitting portion 21c of the light source unit 21 is in contact with the hooking projection 282. The frontend portion of the mount substrate 21b of the light source unit 21 is in contact with the rear surface 28b of the front panel 28. The light source unit 21 is interposed between the front panel 28 and the inner rear surface of the casing body 27. As a result, the light source unit 21 is fixed between the holding portion 27e and the bottom surface 27h and the lower surface of the light transmitting portion 21c of the light source unit 21 is exposed to the external environment through the lighting window 25 provided through the casing body 27.

(2-1-4) Pair of Position Adjustors

As shown in FIGS. 3 and 4, the pair of position adjustors 3 are formed to be fitted into the pair of recesses 23 of the casing 22 to be rotatable by predetermined degrees around the pair of projecting shafts 24 of the casing 22. The pair of position adjustors 3 are formed to be bilaterally (reflectionally) symmetrical to each other. Each of the pair of position adjustors 3 includes a body 31, a hook 32, and a shaft hole 33.

The body 31 may be formed in, for example, a rectangular flat plate shape. The body 31 is fitted into an associated one of the recesses 23 of the casing 22 such that the thickness of the body 31 (in the rightward/leftward direction) is aligned with the depth of the recess 23 of the casing 22. The body 31 has an inner principal surface 31a and an outer principal surface 31b. The inner principal surface 31a of the body 31 may be a planar surface, for example, and faces the bottom surface (which may be a planar surface as well) of the associated recess 23 of the casing 22. The outer principal surface 31b of the body 31 is opposite from the inner principal surface 31a. The outer principal surface 31b is an outwardly convex curved surface.

The shaft hole 33 is a hole to which an associated one of the pair of projecting shafts 24 of the casing 22 is fitted rotatably. The shaft hole 33 is provided for its associated inner principal surface 31a of the body 31 (more specifically, provided at the vertical middle of a front portion of the inner principal surface 31a).

The hook 32 is to be hooked into an associated guide portion 43 of the outer shell 4 to be movable along the guide portion 43. The hook 32 may have a flat plate shape, for example. The hook 32 is provided for the outer principal surface 31b of the body 31 (more specifically, provided at the middle of the outer principal surface 31b in the forward/backward direction). The hook 32 protrudes sideways from the outer principal surface 31b and extends in the upward/downward direction along the outer principal surface 31b.

The body 31 has a frontend surface 31f. The frontend surface 31f may have a generally rectangular shape, for example. The frontend surface 31f has an inner shape 31g and an outer shape 31h. The inner shape 31g is formed by the inner side, upper side, and lower side of the frontend surface 31f and is a shape that allows the position adjustor 3 to be fitted into the associated recess 23 on the front surface 22a of the casing 22. The outer shape 31h is formed by an outer side of the frontend surface 31f and may have an arc shape, for example. The frontend surface 31f is formed to be flush with the front surface 22a of the casing 22. More specifically, the frontend surface 31f may be, for example, curved to be smoothly connected to the front surface 22a (which is a gently curved convex surface) of the casing 22.

A rear portion 31i of an upper end surface 31u of the body 31 is curved toward a lower end surface 31d of the body 31. This prevents, when the light source holder 2 rotates backward around the first virtual axis A1, the rear portion 31i of the upper end surface 31u of the body 31 from interfering with the associated recess 23 of the casing 22.

The upper end surface 31u of the body 31 is one end surface, aligned with the direction of rotation around the second virtual axis A2, of the body 31. The upper end surface 31u of the body 31 serves as an operating member for the operator to turn the light source holder 2 around the second virtual axis A2 by putting his or her fingers thereon.

Figure 8:
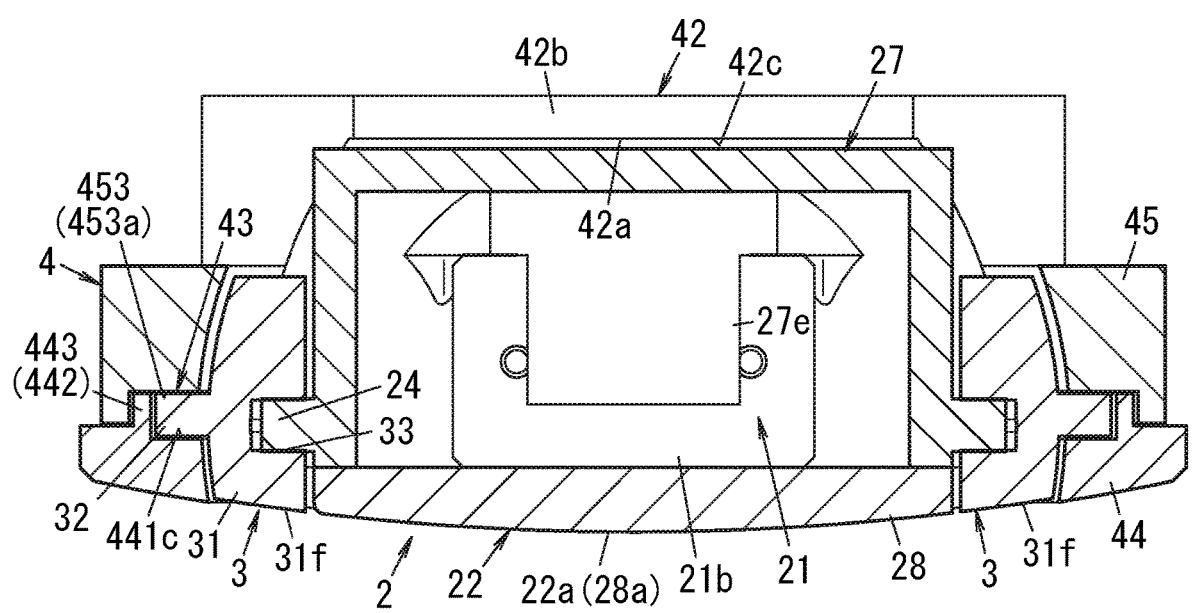
FIG. 8 is a cross-sectional view of the lighting fixture taken along the plane VIII-VIII shown in FIG. 1.

As shown in FIG. 8, in a state where the pair of position adjustors 3 are arranged in the pair of recesses 23 of the casing 22, the pair of projecting shafts 24 of the casing 22 are rotatably fitted into the respective shaft holes 33 of the pair of position adjustors 3. In addition, the inner shape 31g of the frontend surface 31f of each position adjustor 3 is fitted into its associated recess 23 (see FIG. 1). That is to say, the gap between the frontend surface 31f and the recess 23 is limited to be as narrow as possible. Meanwhile, the respective outer shapes 31h (in an arc shape) of the frontend surfaces 31f form, along with the rest of the outer peripheral shape of the front surface 22a of the casing 22 other than the recesses 23 (i.e., upper and lower arc portions), a circle shape. In addition, the respective frontend surfaces 31f are flush with the front surface 22a of the casing 22 to form a gently curved surface (see FIG. 8).

(2-1-5) Outer Shell

The outer shell 4 houses the light source holder 2 and the pair of position adjustors 3 (see FIG. 1). As shown in FIG. 6, the outer shell 4 may have, for example, a frame shape (such as an annular frame shape).

The outer shell 4 includes an outer shell body 41, an opening 4a, and a housing portion 4b.

The outer shell body 41 may be, for example, an annular frame member. The opening 4a is provided on the front side of the outer shell body 41. In the opening 4a, the light source holder 2 and the pair of position adjustors 3 are arranged (see FIG. 1). The housing portion 4b houses the light source holder 2 and the pair of position adjustors 3, is provided inside the outer shell body 41, and is coupled to the opening 4a. The inner peripheral surface 4c of the housing portion 4b is shaped to be fitted onto the outer peripheral side surface 22b of the light source holder 2. That is to say, the inner peripheral surface 4c of the housing portion 4b has substantially the same curved shape as the outer peripheral side surface 22b. The rear side of the housing portion 4b is open on the rear side of the outer shell 4.

The outer shell 4 further includes a pair of guide portions 43 and a stopper portion 42.

The pair of guide portions 43 catches the respective hooks 32 of the pair of position adjustors 3 and may be formed as a pair of grooves, for example. The pair of guide portions 43 are provided on the inner peripheral surface 4c of the housing portion 4b (more specifically, provided on the right and left sides of a front edge portion of the inner peripheral surface 4c) and extend along the circumference of the inner peripheral surface 4c.

The respective hooks 32 of the pair of position adjustors 3 are movable along the length of the pair of guide portions 43 while being caught in the pair of guide portions 43. Specifically, as the light source holder 2 rotates around the second virtual axis A2, the respective hooks 32 of the pair of position adjustors 3 move along the pair of guide portions 43. The movable range of each of the hooks 32 is limited to the range between both longitudinal ends of an associated one of the guide portions 43. Thus, the range of rotation of the light source holder 2 around the second virtual axis A2 is limited to a range corresponding to the movable range of the respective hooks 32.

The stopper portion 42 is provided to limit the range of rotation of the light source holder 2 around the first virtual axis A1. The stopper portion 42 is formed to close a lower part of the rear opening of the housing portion 4b at the rear opening of the outer shell body 41. Bringing a lower part of the rear surface 2c of the light source holder 2 (i.e., the rear surface of the casing 22) into contact with a front surface 42a of the stopper portion 42 prohibits the light source holder 2 from rotating forward around the first virtual axis A1 from a reference position around the first virtual axis A1 (see FIG. 7). As used herein, the "reference position around the first virtual axis A1" refers to a state where the front surface 22a of the light source holder 2 is parallel to the opening plane 4S of the outer shell 4. More specifically, the "state where the front surface 22a of the light source holder 2 is parallel to the opening plane 4S of the outer shell 4" herein refers to a state where the front surface 22a in its entirety is parallel to the opening plane 4S if the front surface 22a of the light source holder 2 is a planar surface but refers to a state where the outer periphery of the front surface 22a is parallel to the opening plane 4S if the front surface 22a of the light source holder 2 is not a planar surface (but is a curved surface as in this embodiment). Note that in the state where state where the front surface 22a of the light source holder 2 is parallel to the opening plane 4S of the outer shell 4, the outer peripheral side surface 22b of the light source holder 2 is entirely housed in the housing portion 4b of the outer shell 4 in this embodiment. In addition, the rear surface 22c of the light source holder 2 comes into contact with either a front corner portion 42c or upper end surface 42b of the stopper portion 42, thereby prohibiting the light source holder 2 from rotating backward by predetermined degrees or more around the first virtual axis A1 from the reference position (see FIG. 7). Note that the front corner portion 42c of the stopper portion 42 herein refers to a corner portion formed between the front surface 42a and upper end surface 42b of the stopper portion 42.

(2-1-6) Assembled Structure of Outer Shell

As shown in FIGS. 3 and 4, the outer shell 4 includes a front member 44 and a rear member 45. In other words, the outer shell 4 is an assembly of two separate parts that are the front member 44 and the rear member 45.

The front member 44 has a ringlike plate shape (e.g., an annular plate shape) and forms a front part (i.e., a part located forward of the pair of guide portions 43) of the outer shell 4. The front member 44 includes a front member body 441 and a pair of wall portions 442.

The front member body 441 has a ringlike plate shape (e.g., an annular plate shape) and has an annular front surface 441a and an annular rear surface 441b.

The pair of wall portions 442 are provided on right and left sides of the rear surface 441b of the front member body 441 and protrude backward. Each wall portion 442 includes a middle wall portion 443 and two end wall portions 444.

The middle wall portion 443 forms the bottom surface of an associated one of the recessed guide portions 43. The middle wall portion 443 is provided at the middle of the width (i.e., along the diameter of the front member body 441) of the rear surface 441b of the front member body 441 and is extended along the circumference of the front member body 441.

The two end wall portions 444 form both longitudinal end surfaces of the recessed guide portion 43. The two end wall portions 444 are provided on both longitudinal ends of the middle wall portion 443 on the rear surface 441b of the front member body 441. The two end wall portions 444 are provided along the inner peripheral edge of the rear surface 441b of the front member body 441. The respective inner side surfaces of the two end wall portions 444 are flush with the inner peripheral surface of the front member body 441. The two end wall portions 444 protrude backward with respect to the middle wall portion 443.

On the rear surface 441b of the front member body 441, two regions 441c, each of which is surrounded with its associated middle wall portion 443 and two end wall portions 444, each form a front side surface of its associated recessed guide portion 43.

The rear member 45 has a frame shape (e.g., a circular frame shape) and forms a rear part of the outer shell 4 (i.e., part backward of the pair of guide portions 43).

The rear member 45 includes a rear member body 451, a pair of fitting recesses 452, and the stopper portion 42.

The rear member body 451 has a frame shape (e.g., a circular frame shape). The pair of fitting recesses 452 are portions into which the pair of wall portions 442 of the front member body 441 are fitted. The pair of fitting recesses 452 are provided on the right and left sides of a front surface 451a of the rear member body 451. The inner side surface of each of the fitting recesses 452 is open on the inner peripheral surface of the rear member body 451.

Each of the fitting recesses 452 includes a middle recess 453 and two end recesses 454.

The middle recess 453 is a portion into which an associated middle wall portion 443 of the front member body 441 is fitted. More specifically, the rear end surface 443a of the middle wall portion 443 comes into contact with the outer edge of the bottom surface 453a of the middle recess 453. The inner edge of the bottom surface 453a of the middle recess 453 forms the rear side surface of the guide portion 43. The two end recesses 454 are portions into which the associated two end wall portions 444 of the front member body 441 are fitted. The two end recesses 454 are formed to be deeper than the middle recess 453. The stopper portion 42 is formed to close the lower part of the rear opening of the rear member body 451 (i.e., the rear opening of the housing portion 4b) on the rear surface of the rear member body 451 (i.e., on the rear surface of the outer shell body 41).

As shown in FIG. 8, the front member 44 is attached to the front surface 451a of the rear member 45. In this assembled state, the front member 44 is fixed onto the front surface 451a of the rear member 45 with either an adhesive or screws. In this fixed state, the guide portions 43 are each formed to be surrounded with its associated region 441c and wall portion 442 of the front member 44 (see FIG. 4) and the bottom surface 453a of the rear member 45.

In a state where this lighting fixture 1 is installed on a wall, for example, the rear member 45 may be embedded in the wall and the front member 44 may be exposed on the wall surface.

(2-1-7) Lighting Device

The lighting device 5 controls the lighting state of the light source unit 21 in response to rotation of the light source holder 2 around the first virtual axis A1 and around the second virtual axis A2. As shown in FIG. 9, the lighting device 5 includes detection units 51, 52 and a control unit 53.

The detection unit 51 (first detection unit) detects the position of rotation of the light source holder 2 around the first virtual axis A1. The detection unit 52 (second detection unit) detects the position of rotation of the light source holder 2 around the second virtual axis A2. The detection units 51, 52 may be of a contact type (mechanical type) or a contactless type. The contact-type detection unit may detect the position of rotation of the light source holder 2 based on, for example, the ON/OFF states of a detection switch (mechanical switch) to be turned ON and OFF according to the position of rotation of the light source holder 2. The contactless-type detection unit may detect the position of rotation of the light source holder 2 based on, for example, a result of detection by a proximity sensor for detecting the relative distance, varying according to the position of the rotation of the light source holder 2, between the light source holder 2 and a surrounding member. Examples of the proximity sensors include inductive, magnetic, capacitive, ultrasonic, and radio wave proximity sensors.

The control unit 53 controls the lighting state of the light source unit 21 based on the results of detection by the detection units 51, 52. More specifically, the control unit 53 selects, based on the result of detection by the detection unit 52 (e.g., the angle of rotation of the light source holder 2 around the second virtual axis A2), a light source 21a to turn ON from the plurality of light sources 21a. This allows the control unit 53 to change, depending on the result of detection by the detection unit 52, the light color of the illuminating light emitted from the lighting fixture 1 (i.e., the light color of the light source 21a). In addition, this also allows the control unit 53 to turn, depending on the result of detection by the detection unit 51 (i.e., the position of rotation of the light source holder 2 around the first virtual axis A1), ON and OFF the light source 21a selected.

(3) How Lighting Fixture may be Operated

In this lighting fixture 1, the light source holder 2 may rotate around the first virtual axis A1 and the second virtual axis A2. The lighting fixture 1 is initially located at the reference position around the first virtual axis A1 and at the reference position around the second virtual axis A2 (see FIG. 1). The reference position around the first virtual axis A1 herein refers to the state where the front surface 22a of the light source holder 2 is parallel to the opening plane 4S of the outer shell 4 as described above. In that state, the lighting window 25 of the light source holder 2 is retracted into the outer shell 4. The reference position around the second virtual axis A2 herein refers to a state where the lighting window 25 of the light source holder 2 is located right under the circumference of the light source holder 2.

In the state where the light source holder 2 is located at the reference position around the first virtual axis A1, the operator is allowed to turn the light source holder 2 backward (see FIG. 2) from the reference position around the first virtual axis A1 by pushing an upper part of the light source holder 2 backward with his or her fingers as indicated by the open arrow F1 in FIG. 1. Turning the light source holder 2 backward in this manner allows the lighting window 25 of the light source holder 2 to be exposed outside of the opening 4a of the outer shell 4.

At this time, the detection unit 52 detects the position of rotation of the light source holder 2 around the second virtual axis A2. Meanwhile, based on the result of the detection, the control unit 53 selects one of the multiple (e.g., two) light sources 21a as a light source 21a to turn ON. For example, if the light source holder 2 is located at the reference position around the second virtual axis A2, the control unit 53 selects a light source 21a in neutral white. Then, when the light source holder 2 is turned backward as described above, the detection unit 51 detects the backward rotation and the control unit 53 turns the selected light source 21a ON. This allows illuminating light C1 in neutral white to be projected through the lighting window 25 of the light source holder 2.

In the state where the light source holder 2 has turned backward as described above, the front surface 22a of the light source holder 2 is tilted backward. Thus, the upper part of the front surface 22a of the light source holder 2 is located backward of the respective upper end surfaces 31u of the pair of position adjustors 3. That is to say, the respective upper end surfaces 31u of the pair of position adjustors 3 protrude forward of the front surface 22a of the light source holder 2. In this protruding state, the operator is allowed to turn the light source holder 2 counterclockwise around the second virtual axis A2 by pushing down the upper end surface 31u of the position adjustor 3 on the left with his or her fingers as indicated by the open arrow F2 in FIG. 2. In addition, the operator is also allowed to turn the light source holder 2 clockwise around the second virtual axis A2 by pushing down the upper end surface 31u of the position adjustor 3 on the right with his or her fingers as indicated by the open arrow F3 in FIG. 2. In this manner, the operator may turn the light source holder 2 around the second virtual axis A2 by pushing down the upper end surface 31u of one of the pair of position adjustors 3 in the state where the light source holder 2 has been turned backward.

Then, as the light source holder 2 has been turned around the second virtual axis A2, the detection unit 52 detects the rotation and the control unit 53 selectively changes, based on the result of detection, the light source 21a to turn ON from the plurality of light sources 21a. As a result, the light projected through the lighting window 25 of the light source holder 2 changes its light color. As can be seen, the illuminating light C1 projected through the lighting window 25 of the light source holder 2 may have its light color changed by turning the light source holder 2 around the second virtual axis A2.

Alternatively, in the state where the light source holder 2 has been turned backward as described above, the operator may also turn the light source holder 2 forward to the reference position around the first virtual axis A1 by pushing back the lower part of the light source holder 2 as indicated by the open arrow F4 in FIG. 2. When the light source holder 2 is returned to the reference position around the first virtual axis A1, the lighting window 25 of the light source holder 2 is retracted into the outer shell 4. In addition, when the light source holder 2 is returned to the reference position around the first virtual axis A1, the detection unit 51 detects the rotation and the control unit 53 turns the ON-state light source 21a OFF based on the result of detection.

(4) Major Advantages

As can be seen from the foregoing description, a lighting fixture 1 according to the exemplary embodiment described above includes a light source holder 2, a pair of position adjustors 3, and an outer shell 4. The light source holder 2 holds a light source 21a. The pair of position adjustors 3 are arranged to face each other and interpose the light source holder 2 between themselves. The pair of position adjustors 3 support the light source holder 2 thereon to allow the light source holder 2 to rotate around a first virtual axis A1. The first virtual axis A1 is defined as a virtual axis that passes through the pair of position adjustors 3. The outer shell 4 has an opening 4a in which the light source holder 2 and the pair of position adjustors 3 are arranged and supports the pair of position adjustors 3 to allow the pair of position adjustors 3 to rotate around a second virtual axis A2. The second virtual axis A2 is defined by a normal to an opening plane 4S of the opening 4a. The first virtual axis A1 intersects (e.g., at right angles) with the second virtual axis A2 and is located either within or behind the opening plane 4S.

According to this configuration, the first virtual axis A1 intersects with the second virtual axis A2 and is located either within or behind the opening plane 4S of the outer shell 4. This may reduce the protrusion of the light source holder 2 and the pair of position adjustors 3 forward of the opening plane 4S of the outer shell 4. In other words, this allows the light source holder 2 and the pair of position adjustors 3 to be housed inside the (housing portion 4b of the) outer shell 4 either entirely or almost entirely. Consequently, the lighting fixture 1 (in particular, its part forward of the outer shell 4) may have a reduced thickness.

In addition, when the light source holder 2 rotates around the first virtual axis A1, one end surface (upper end surface) 31$u$, aligned with the direction of rotation around the second virtual axis A2, of each of the pair of position adjustors 3 is located forward of the front surface 22$a$ of the light source holder 2. This allows the one end surface (upper end surface) 31$u$ of each of the pair of position adjustors 3 to be used as an operating member for the operator to turn the light source holder 2 around the second virtual axis A2 by putting his or her fingers thereon. This improves the operability of the light source holder 2 when the light source holder 2 needs to be turned around the second virtual axis A2. That is to say, this improves the operability of the light source holder 2 around the second virtual axis A2 while reducing the overall size of the lighting fixture 1 at the same time.

(5) Variations

Next, variations of the exemplary embodiment will be described. In the following description, any constituent element of the variations, having the same function as a counterpart of the embodiment described above, will be designated by the same reference numeral as that counterpart's, and description thereof will be omitted herein. The following description of the variations will be focused on differences from the exemplary embodiment described above. Optionally, any of the variations to be described below may be adopted in combination with the exemplary embodiment described above.

First Variation

As a first variation, a specific detection method applicable to a situation where the detection unit 51 of the exemplary embodiment described above is a contactless type detection unit will be described with reference to FIGS. 10A and 10B. In that case, the detection unit 51 may be disposed, for example, inside the light source unit 21 of the light source holder 2 or on an upper part of the casing 22 as shown in FIG. 10A. As used herein, the "upper part of the casing 22" refers to, for example, an inner part, located on the backside of an upper surface portion of the outer peripheral side surface 22$b$, of the casing 22 (more specifically, on the backside of the rear part of the upper surface portion).

More specifically, in the arrangement in which the detection unit 51 (51A) is provided inside the light source unit 21, the detection direction D1 of the detection unit 51A is a direction pointing outward from the lighting window 25 of the casing 22. When the position of rotation of the light source holder 2 around the first virtual axis A1 is the reference position (see FIG. 10A), the light source holder 2 is housed inside the outer shell 4. Thus, the inner peripheral surface 4$c$ of the outer shell 4 is present in front of the lighting window 25. Consequently, in that case, the detection unit 51A detects the distance to the inner peripheral surface 4$c$ in front of the detection unit 51A (i.e., a distance shorter than a predetermined distance). If the light source holder 2 has been turned backward around the first virtual axis A1 (see FIG. 10B), then the lower part of the light source holder 2 protrudes forward of the outer shell 4. Thus, in such a situation, the inner peripheral surface 4$c$ of the outer shell 4 is not present in front of the lighting window 25. As a result, in that case, the detection unit 51A detects a distance longer than the predetermined distance.

On the other hand, in the arrangement in which the detection unit 51 (51B) is provided in the upper part of the casing 22, the detection direction D1 of the detection unit 51B is a direction pointing outward from inside the casing 22 toward the space above the casing 22 through a hole K1 of the casing 22. When the position of rotation of the light source holder 2 around the first virtual axis A1 is the reference position (see FIG. 10A), the light source holder 2 is housed inside the outer shell 4. Thus, the inner peripheral surface 4$c$ of the outer shell 4 is present in front of the upper part of the casing 22. Consequently, in that case, the detection unit 51B detects the distance to the inner peripheral surface 4$c$ in front of the detection unit 51B (i.e., a distance shorter than a predetermined distance). If the light source holder 2 has been turned backward around the first virtual axis A1 (see FIG. 10B), then the lower part of the light source holder 2 protrudes forward of the outer shell 4. Thus, in such a situation, the inner peripheral surface 4$c$ of the outer shell 4 is not present in front of the upper part of the casing 22. As a result, in that case, the detection unit 51B detects a distance longer than the predetermined distance.

According to each of these two configurations, the control unit 53 of the lighting device 5 determines, by seeing if the detection value of the detection unit 51 (51A, 51B) is longer than the predetermined distance, whether the light source holder 2 is located at the reference position around the first virtual axis A1 or has turned backward around the first virtual axis A1. Then, the control unit 53 turns the light source 21$a$ ON or OFF depending on the decision result. More specifically, when finding the detection value of the detection unit 51 shorter than the predetermined distance, the control unit 53 decides that the light source holder 2 should be located at the reference position and turns the light source 21$a$ OFF. On the other hand, when finding the detection value of the detection unit 51 longer than the predetermined distance, the control unit 53 decides that the light source holder 2 should have been turned backward and turns the light source 21$a$ ON.

Second Variation

As a second variation, a specific detection method applicable to a situation where the detection unit 51 of the exemplary embodiment described above is a contact-type detection unit will be described with reference to FIGS. 11A and 11B. That is to say, the detection unit 51 includes a detecting switch (mechanical switch) that turns ON and OFF in response to the rotation of the light source holder 2. In that case, the detection unit 51 may be disposed either on a lower surface part of the outer peripheral side surface 22$b$ of the casing 22 (more specifically, rear half of the lower surface part, i.e., behind the lighting window 25) or on an upper surface part (more specifically, front half of the upper surface part).

More specifically, in the arrangement in which the detection unit 51 (51C) is provided on the lower surface part of the outer peripheral side surface 22$b$ of the casing 22, the detecting switch of the detection unit 51C protrudes from the lower surface part of the casing 22. Thus, when the position of rotation of the light source holder 2 around the first virtual axis A1 is the reference position (see FIG. 11A), the inner peripheral surface 4$c$ of the outer shell 4 is present in front of the lower surface part of the casing 22. Consequently, the detecting switch of the detection unit 51C is pressed by the inner peripheral surface 4$c$ of the outer shell 4 and thereby turned ON. On the other hand, if the light source holder 2 has been turned backward around the first virtual axis A1 (see FIG. 11B), the inner peripheral surface 4$c$ of the outer shell 4 is not present in front of the lower surface part of the casing 22. As a result, the detecting switch of the detection unit 51C is not pressed by the inner peripheral surface 4c of the outer shell 4 and therefore turns OFF.

On the other hand, in the arrangement in which the detection unit 51 (51D) is provided on the upper surface part of the outer peripheral side surface 22b of the casing 22, the detecting switch of the detection unit 51D protrudes from the upper surface part of the casing 22. Thus, when the position of rotation of the light source holder 2 around the first virtual axis A1 is the reference position (see FIG. 11A), the inner peripheral surface 4c of the outer shell 4 is present in front of the upper surface part of the casing 22. Consequently, the detecting switch of the detection unit 51D is pressed by the inner peripheral surface 4c of the outer shell 4 and thereby turned ON. On the other hand, if the light source holder 2 has been turned backward around the first virtual axis A1 (see FIG. 11B), the inner peripheral surface 4c of the outer shell 4 is not present in front of the upper surface part of the casing 22. As a result, the detecting switch of the detection unit 51D is not pressed by the inner peripheral surface 4c of the outer shell 4 and therefore turns OFF.

According to each of these two configurations, the control unit 53 of the lighting device 5 determines, by seeing if the detecting switch of the detection unit 51 (51C, 51D) is ON, whether the light source holder 2 is located at the reference position around the first virtual axis A1 or has turned backward around the first virtual axis A1. Then, the control unit 53 turns the light source 21a ON or OFF depending on the decision result. More specifically, when finding the detecting switch of the detection unit 51 ON, the control unit 53 decides that the light source holder 2 should be located at the reference position and turns the light source 21a OFF. On the other hand, when finding the detecting switch of the detection unit 51 OFF, the control unit 53 decides that the light source holder 2 should have been turned backward and turns the light source 21a ON.

Third Variation

In the exemplary embodiment described above, the light color of the illuminating light C1 emitted from the lighting fixture 1 is changed according to the position of rotation of the light source holder 2 around the second virtual axis A2. Specific examples of such a situation will be described as a third variation.

In this variation, the light color of the illuminating light (which may be a spotlight) emitted from the lighting fixture 1 is changed between a plurality of colors (such as the two colors of neutral white and incandescent). The neutral white illuminating light is suitable for reading a book, for example. The incandescent illuminating light is suitable for having a meal, for example.

Figure 13:
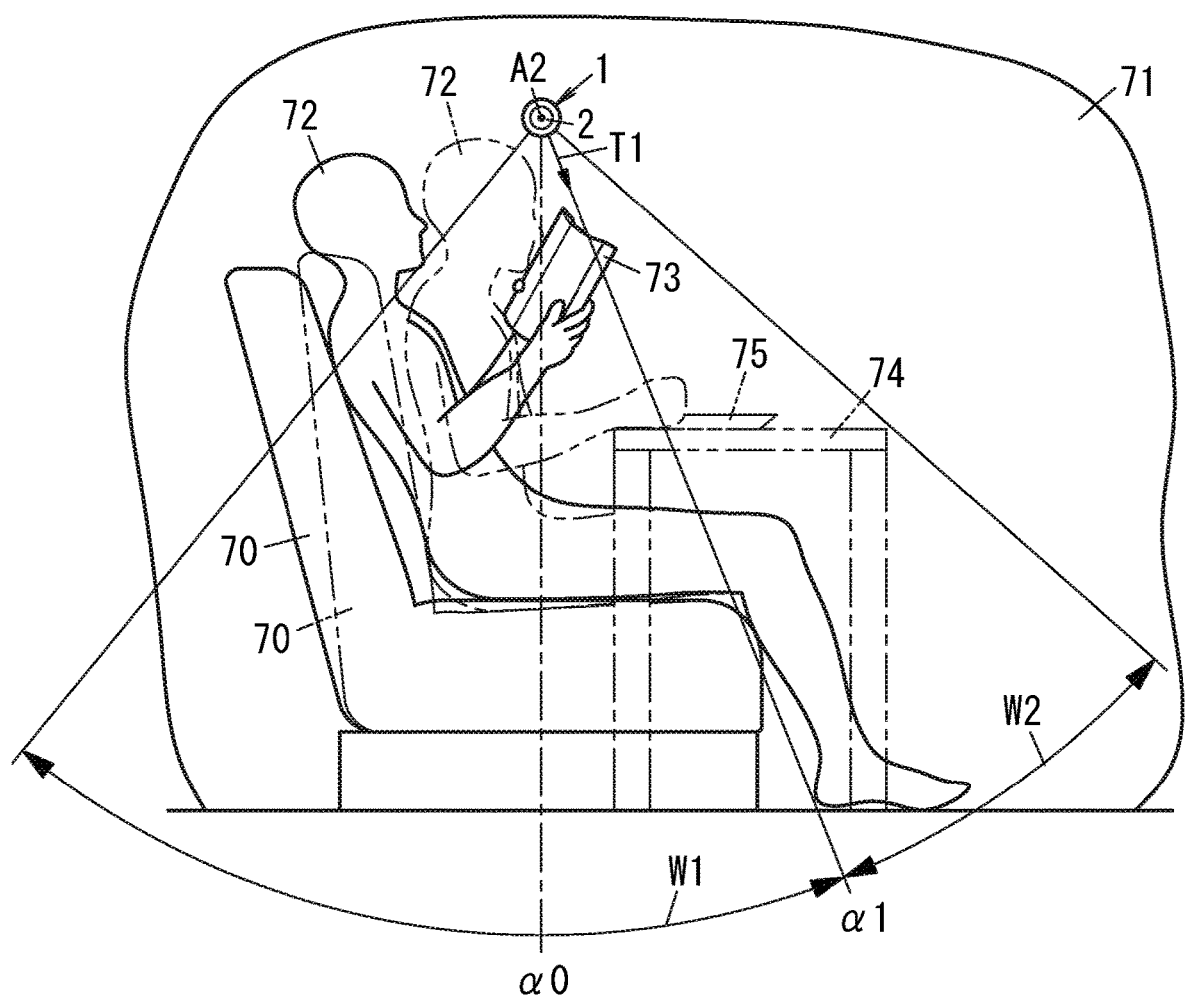
FIG. 13 shows an illuminating direction of a lighting fixture in the situation where the user seated on the chair is having a meal in the third variation and an illuminating direction of the lighting fixture in the situation where the user seated on the chair is reading a book in the third variation.

In this variation, the lighting fixture 1 is installed on a wall 71 beside a chair 70 and may illuminate the chair 70 and its surroundings by irradiating the region under the lighting fixture 1 with the illuminating light (see FIG. 13). At this time, the illuminating direction T1 of the lighting fixture 1 may be changed in the forward/backward direction by turning the light source holder 2 of the lighting fixture 1 around the second virtual axis A2. In FIG. 13, the second virtual axis A2 is perpendicular to the wall 71.

Figure 12A:
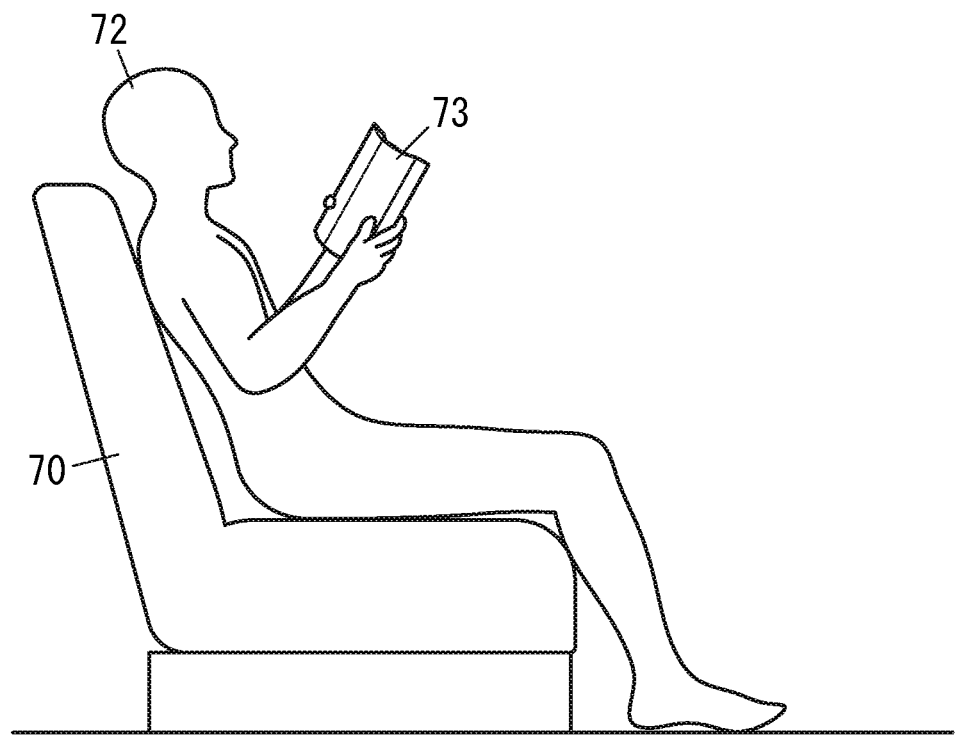
FIG. 12A illustrates how the user sits on a chair to read a book in a third variation.
Figure 12B:
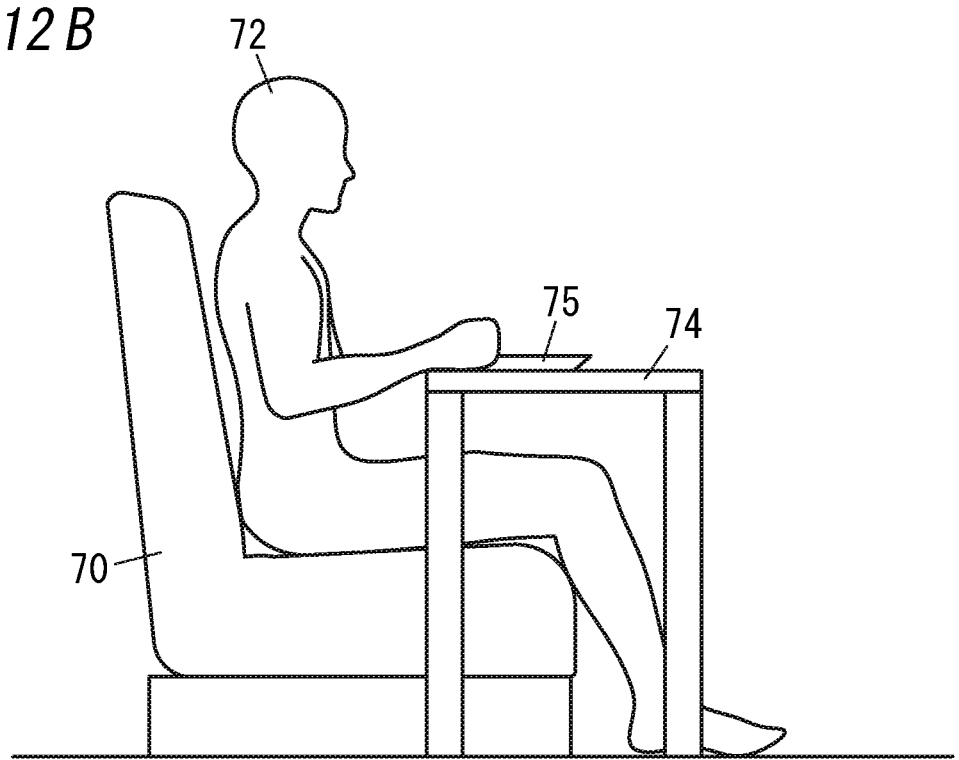
FIG. 12B illustrates how the user sits on the chair to have a meal in the third variation.

In this variation, when the user 72 sits on the chair 70 to read a book 73, the user 72 is supposed to be seated while leaning him- or herself on the back of the chair 70 which is turned slightly backward and bring the book 73 toward his or her chest (see FIG. 12A). Thus, the book 73 is supposed to be located in the rear half of the chair 70. On the other hand, when the user 72 sits on the chair 70 to have a meal at a table 74, the table 74 on which a dish 75 is put is supposed to be located in the front half of the chair 70.

Therefore, if the light source holder 2 has been turned around the second virtual axis A2 to such a degree that the illuminating direction T1 of the lighting fixture 1 falls within a rotational range W2 covering the table 74 as shown in FIG. 13, the lighting fixture 1 changes the light color of the illuminating light into incandescent color. That is to say, the control unit 53 of the lighting fixture 1 selects the incandescent light source 21a as a light source to turn ON out of the two light sources 21a. On the other hand, if the light source holder 2 has been turned around the second virtual axis A2 to such a degree that the illuminating direction T1 of the lighting fixture 1 falls within a rotational range W1 not covering the table 74 as shown in FIG. 143, the lighting fixture 1 changes the light color of the illuminating light into neutral white color. That is to say, the control unit 53 of the lighting fixture 1 selects the neutral white light source 21a as a light source to turn ON out of the two light sources 21a.

The position of rotation α1 shown in FIG. 13 is located at the boundary between the two rotational ranges W1 and W2. In this variation, the position of rotation α1 has shifted counterclockwise with respect to the reference position α0 of the light source holder 2 around the second virtual axis A2. In this variation, if the position of the rotation of the light source holder 2 around the second virtual axis A2 falls within the range W2 which is shifted counterclockwise with respect to the position of rotation α1, the control unit 53 selects the incandescent light source 21a as a light source to turn ON. On the other hand, if the position of the rotation of the light source holder 2 around the second virtual axis A2 falls within the range W1 which is shifted clockwise with respect to the position of rotation α1, the control unit 53 selects the neutral white light source 21a as a light source to turn ON. This enables changing the light color of the illuminating light emitted from the lighting fixture 1 according to the intended use by adjusting the position of rotation of the light source holder 2 around the second virtual axis A2 depending on, for example, whether the user 72 is taking a meal or reading a book.

(6) Aspects

The embodiment and its variations described above may be specific implementations of the following aspects of the present disclosure.

A lighting fixture (1) according to a first aspect includes a light source holder (2), a pair of position adjustors (3), and an outer shell (4). The light source holder (2) holds a light source (21a). The pair of position adjustors (3) are arranged to face each other and interpose the light source holder (2) between themselves. The pair of position adjustors (3) support the light source holder (2) thereon to allow the light source holder (2) to rotate around a first virtual axis (A1). The first virtual axis (A1) is defined as a virtual axis that passes through the pair of position adjustors (3). The outer shell (4) has an opening (4a) in which the light source holder (2) and the pair of position adjustors (3) are arranged and supports the pair of position adjustors (3) to allow the pair of position adjustors (3) to rotate around a second virtual axis (A2). The second virtual axis (A2) is defined by a normal to an opening plane (4S) of the opening (4a). The first virtual axis (A1) intersects with the second virtual axis (A2) and is located either within or behind the opening plane (4S).

According to this configuration, the first virtual axis (A1) intersects with the second virtual axis (A2) and is located either within or behind the opening plane (4S) of the outer shell (4). This may reduce the protrusion of the light source holder (2) and the pair of position adjustors (3) forward of the opening plane (4S) of the outer shell (4). In other words, this allows the light source holder (2) and the pair of position adjustors (3) to be housed inside the outer shell (4) entirely (or almost entirely). Consequently, the lighting fixture (1) (in particular, its part forward of the outer shell (4)) may have a reduced thickness.

In a lighting fixture (1) according to a second aspect, which may be implemented in conjunction with the first aspect, each of the pair of position adjustors (3) is arranged to have one end surface (31u) thereof, aligned with a direction of rotation around the second virtual axis (A2), located forward of a front surface (22a) of the light source holder (2) in a situation where the light source holder (2) has rotated around the first virtual axis (A1).

This configuration allows, in a state where the light source holder (2) has been turned around the first virtual axis (A1), the one end surface (31u) of each of the pair of position adjustors (3) to be used as an operating member for the operator to turn the light source holder (2) around the second virtual axis (A2) by putting his or her fingers thereon. This improves the operability of the light source holder (2) when the light source holder (2) needs to be turned around the second virtual axis (A2). That is to say, this improves the operability of the light source holder (2) around the second virtual axis (A2) while reducing the overall size of the lighting fixture (1) at the same time.

In a lighting fixture (1) according to a third aspect, which may be implemented in conjunction with the first or second aspect, the light source holder (2) has an outer peripheral side surface (22b) located on an outer periphery of a front surface (22a) of the light source holder (2). The outer peripheral side surface (22b) has a lighting window (25) to allow light emitted from the light source (21a) to emerge out of the light source holder (2).

This configuration allows the lighting window (25) of the light source holder (2) to be selectively exposed out of, or retracted into, the outer shell (4) by turning the light source holder (2) around the first virtual axis (A1). This facilitates harmonizing the lighting fixture (1) with its installation environment by exposing the lighting window (25) out of the outer shell (4) only when the lighting fixture (1) is turned ON and retracting the lighting window (25) into the outer shell (4) when the lighting fixture (1) is turned OFF.

In a lighting fixture (1) according to a fourth aspect, which may be implemented in conjunction with the third aspect, the lighting window (25) is retracted into the outer shell (4) when the front surface (22a) of the light source holder (2) is parallel to the opening plane (4S).

This configuration allows the lighting window (25) to be retracted into the outer shell (4) easily by turning the front surface (22a) of the light source holder (2) parallel to the opening plane (4S) of the outer shell (4).

A lighting fixture (1) according to a fifth aspect, which may be implemented in conjunction with the third or fourth aspect, further includes a first detection unit (51) to detect a position of rotation of the light source holder (2) around the first virtual axis (A1). The light source (21a) is selectively turned ON and OFF depending on a result of detection by the first detection unit (51).

This configuration allows the light source (21a) to be selectively turned ON and OFF by turning the light source holder (2) around the first virtual axis (A1).

In a lighting fixture (1) according to a sixth aspect, which may be implemented in conjunction with the fifth aspect, the first detection unit (51) includes a mechanical switch to turn ON and OFF according to the position of rotation of the light source holder (2) around the first virtual axis (A1).

This configuration allows implementing the first detection unit (51) having a simple configuration.

In a lighting fixture (1) according to a seventh aspect, which may be implemented in conjunction with the fifth aspect, the first detection unit (51) includes a contactless sensor to detect the position of rotation of the light source holder (2) contactlessly around the first virtual axis (A1).

A lighting fixture (1) according to an eighth aspect, which may be implemented in conjunction with any one of the third to sixth aspects, further includes a second detection unit (52) to detect a position of rotation of the light source holder (2) around the second virtual axis (A2). The light source (21a) changes its light color according to a result of detection by the second detection unit (52).

According to this configuration, the lighting fixture (1) is supposed to change the intended use of its illuminating light according to the position of rotation of the light source holder (2) around the second virtual axis (A2). This allows providing illuminating light in an appropriate color according to the intended use of the illuminating light of the lighting fixture (1).

In a lighting fixture (1) according to a ninth aspect, which may be implemented in conjunction with any one of the first to eighth aspects, the outer shell (4) includes a housing portion (4b) and a guide portion (43). The housing portion (4b) is arranged to house the light source holder (2) and the pair of position adjustors (3) and coupled to the opening (4a). The guide portion (43) is provided on an inner peripheral surface (4c) of the housing portion (4b) and along a circumference of the inner peripheral surface (4c). Each of the pair of position adjustors (3) includes a hook (32) to be caught in the guide portion (43). The light source holder (2) is caused to rotate around the second virtual axis (A2) by moving the respective hooks (32) of the pair of position adjustors (3) along the guide portion (43).

This configuration allows the light source holder (2) to be turned around the second virtual axis (A2) by using a simple structure.

In a lighting fixture (1) according to a tenth aspect, which may be implemented in conjunction with any one of the first to ninth aspects, the light source holder (2) has a pair of recesses (23), into which the pair of position adjustors (3) are respectively fitted, on both side portions thereof in a direction aligned with the first virtual axis (A1)

This configuration may reduce the protrusion of the pair of position adjustors (3) out of the light source holder (2) in the direction aligned with the first virtual axis (A1). This reduces the chances of leaving a gap between the opening (4a) of the outer shell (4), the light source holder (2), and the pair of position adjustors (3), thus improving the appearance of the lighting fixture (1) in terms of its design.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting fixture, comprising:
   a light source holder configured to hold a light source;
   a pair of position adjustors arranged to face each other and interpose the light source holder between the position adjustors themselves, the pair of position adjustors supporting the light source holder thereon to allow the light source holder to rotate around a first virtual axis, the first virtual axis being defined as a virtual axis that passes through the pair of position adjustors; and an outer shell having an opening in which the light source holder and the pair of position adjustors are arranged and supporting the pair of position adjustors to allow the pair of position adjustors to rotate around a second virtual axis, the second virtual axis being defined by a normal to an opening plane of the opening, the first virtual axis intersecting with the second virtual axis and being located either within or behind the opening plane, wherein each of the pair of position adjustors is arranged to have one end surface thereof, aligned with a direction of rotation around the second virtual axis, at least part at the one end surface located forward of a part close to the one end surface relative to the first virtual axis, of a front surface of the light source holder in a situation where the light source holder has rotated around the first virtual axis, and wherein the light source holder comprises a pair of facing parts, at least part of each of the pair of facing parts facing an either one of the pair of position adjustors along a virtual axis perpendicular to both the first virtual axis and the second virtual axis, in a plan view from a direction of the second virtual axis, in at least one of a state in which the light source holder does not rotate about the first virtual axis and a state in which the light source holder rotates about the first virtual axis.

2. The lighting fixture of claim 1,
wherein the outer shell includes
a housing portion arranged to house the light source holder and the pair of position adjustors and coupled to the opening; and
a guide portion provided on an inner peripheral surface of the housing portion and along a circumference of the inner peripheral surface,
wherein each of the pair of position adjustors includes a hook to be caught in the guide portion, and
wherein the light source holder is caused to rotate around the second virtual axis by moving the respective hooks of the pair of position adjustors along the guide portion.

3. The lighting fixture of claim 1,
wherein the light source holder has a pair of recesses, into which the pair of position adjustors are respectively fitted, on both side portions thereof in a direction aligned with the first virtual axis.

4. A lighting fixture, comprising:
a light source holder configured to hold a light source;
a pair of position adjustors arranged to face each other and interpose the light source holder between the position adjustors themselves, the pair of position adjustors supporting the light source holder thereon to allow the light source holder to rotate around a first virtual axis, the first virtual axis being defined as a virtual axis that passes through the pair of position adjustors; and
an outer shell having an opening in which the light source holder and the pair of position adjustors are arranged and supporting the pair of position adjustors to allow the pair of position adjustors to rotate around a second virtual axis, the second virtual axis being defined by a normal to an opening plane of the opening,
the first virtual axis intersecting with the second virtual axis and being located either within or behind the opening plane,
wherein the light source holder has an outer peripheral side surface located on an outer periphery of a front surface of the light source holder, and
the outer peripheral side surface has a lighting window to allow light emitted from the light source to emerge out of the light source holder.

5. The lighting fixture of claim 4,
wherein the lighting window is retracted into the outer shell when the front surface of the light source holder is parallel to the opening plane.

6. The lighting fixture of claim 4, further comprising:
a first detector configured to detect a position of rotation of the light source holder around the first virtual axis,
wherein the light source is configured to be turned ON and OFF depending on a result of detection by the first detector.

7. The lighting fixture of claim 6,
wherein the first detector includes a mechanical switch configured to turn ON and OFF according to the position of rotation of the light source holder around the first virtual axis.

8. The lighting fixture of claim 6,
wherein the first detector includes a contactless sensor configured to detect the position of rotation of the light source holder contactlessly around the first virtual axis.

9. The lighting fixture of claim 4, further comprising:
a detector configured to detect a position of rotation of the light source holder around the second virtual axis,
wherein the light source is configured to change a light color thereof according to a result of detection by the detector.

* * * * *